United States Patent
Hiraishi et al.

(10) Patent No.: US 6,517,752 B1
(45) Date of Patent: Feb. 11, 2003

(54) SURFACE REFORMING METHOD FOR PLASTIC MOLDED PRODUCT

(75) Inventors: Masanori Hiraishi, Osaka (JP); Hiroshi Takahashi, Himeji (JP)

(73) Assignee: Daicel Chemical Industries, Ltd., Sakai (JP)

( * ) Notice: Subject to any disclaimer, the term of this patent is extended or adjusted under 35 U.S.C. 154(b) by 252 days.

(21) Appl. No.: 09/664,741

(22) Filed: Sep. 19, 2000

(30) Foreign Application Priority Data

Sep. 21, 1999 (JP) .......................................... 11-267828
Jul. 17, 2000 (JP) ...................................... 2000-216175

(51) Int. Cl.$^7$ .............................................. B29C 71/00

(52) U.S. Cl. .......................... 264/28; 264/85; 264/232; 264/340; 264/523

(58) Field of Search ............................. 264/28, 82, 85, 264/232, 523, 37.14, 340; 134/22.1, 22.18

(56) References Cited

U.S. PATENT DOCUMENTS

| 5,167,883 | A | * | 12/1992 | Takemasa et al. | ............. 264/28 |
| 5,670,614 | A | * | 9/1997 | Roby et al. | ..................... 521/40 |
| 5,756,657 | A | * | 5/1998 | Sawan et al. | ................ 528/487 |
| 6,180,031 | B1 | * | 1/2001 | Bawa et al. | ................... 134/31 |

\* cited by examiner

*Primary Examiner*—Suzanne E. McDowell
(74) *Attorney, Agent, or Firm*—Armstrong, Westerman & Hattori, LLP

(57) ABSTRACT

A surface reforming method for a plastic molded product of this invention is characterized by comprising a step (a) for immersing a plastic molded product into supercritical carbon dioxide or subcritical carbon dioxide under a temperature lower than the glass transition temperature of said plastic, and a step (b) for vaporizing carbon dioxide adhered to the surface of the plastic molded product under a temperature lower than the glass transition temperature of said plastic. A plastic molded product may be composed of a polymer having a polar group. Examples of such a plastic molded product are a biaxially oriented polyester film, an unoriented polystyrene film, and a biaxially oriented polystyrene film

8 Claims, 1 Drawing Sheet

SURFACE REFORMING METHOD FOR PLASTIC MOLDED PRODUCT

BACKGROUND OF THE INVENTION

The present invention relates to a surface reforming method for a plastic molded product and a surface reformed plastic molded product obtained thereby, more specifically, a new, easy, and dean surface reforming method for a plastic molded product in which, it is unnecessary to use a harmful solvent with the danger of explosion and an extremely dangerous high voltage, and in addition, generation of harmful substances and powder is prevented, and troublesome post-processing and expensive equipment for safety are not required.

Plastic molded products are molded by means of injection molding, extrusion, compression molding, and blow molding, and have been widely used for the necessities of life and industrial purposes including necessities of life such as plastic buckets and containers, electrical products such as casings for televisions and sound equipment, various parts for vehicles and car interior accessories such as seats, building materials such as wall materials and sofas, and materials for public facilities such as water pipes.

In many cases, such a plastic molded product is produced as a product by only being molded, however, depending on the purpose of use, various printing, coating with a conductor, powder-coating, adhesion of molded products, and other post-processing are applied to the plastic molded product. In the case where such post-processing must be applied, normally, in order to improve processing performance, the surface of the plastic molded product is activated and reformed.

Usually, as a method for reforming the surface of a plastic molded product, a chemical method such as rough washing before plating, following application of an anchor coating agent, or drying, an electrical method by means of discharge such as corona discharge or plasma discharge, or a physical method such as sandblasting of the surface to become rough is used.

However, in the chemical method using the anchor coating agent, use of extra compounds and disposal of the solvent are required In addition, most of the solvents to be used are harmful or explosive, so that recovery of such solvents needs considerable capital investment and maintenance cost.

Furthermore, in the electrical reforming method by means of discharge such as corona discharge or plasma discharge, expensive equipment is required, and ozone and harmful substances such as nitrogen oxides are generated due to discharge, so that a considerable cost is required for the countermeasure. In addition, the discharging section is highly dangerous, so that countermeasures against this danger are necessary.

Moreover, although the physical method in which the surface is slightly sandblasted to be rough is excellent in terms of cost, extra plastic powder is inevitably generated, and mixing with sand is inevitable.

On the other hand, among plastic molded products, plastic films have been widely used for various purposes including a purpose in the food field such as wrapping films, an industrial purpose such as photographic film bases, drawing films, magnetic disks, magnetic tapes, substrates for flexible liquid crystal panels, flexible printed circuit boards, labels, various electric insulation films, capacitor films, or surface sheets of various switches, and base films for various printing. Most of these plastic films are so-called base films, to which post-processing such as application, extrusion lamination, and printing of various functional materials are applied, and layers of the various functional materials are formed on the surfaces of the films.

For example, a heat seal layer or printing film is laminated on a wrapping film, light-sensitive layers of various colors are laminated and applied on a photographic base film, a magnetic recording material is applied on a magnetic disk and magnetic tape, and a transparent conductive layer is vapor-deposited on a substrate for a flexible liquid crystal panel. Furthermore, a copper foil is laminated or metal is vapor-deposited on a flexible printed circuit board, and screen printing and jet-printing is applied on a label. Moreover, generally, aluminum is vapor-deposited on a capacitor film, and various printing inks are screen-printed on a surface sheet for various switches, and various printing inks are offset-printed on a base film for printing.

When such post-processing is applied to plastic films, in order to increase affinity between the base film and various functional materials to be laminated thereon and maintain the excellent adhered condition between them after post-processing, as in the case of the abovementioned molded products, it is necessary that the surface of the plastic film is activated and reformed.

Usually, as a method for reforming the surface of the plastic film, a method in which the surface is cleansed by a solvent and a method in which a high voltage such as corona discharge is applied to the surface have been used In the former method, impurities which may cause lowering in adhesion power with laminated ingredients are removed by washing the film surface to expose the active original surface of the film, whereby the adhesion power with the laminated ingredients is increased However, this method requires a solvent, so that it has the same problem as in the abovementioned chemical processing method for a plastic molded product.

On the other hand, in the latter method, an active group is introduced into the film surface by using the phenomenon of corona discharge in order to improve the adhesion power of the film surface which is originally weak. However, this method also has the same problem as in the abovementioned electric reforming method for a plastic molded product.

Recently, as introduced below, various attempts to apply a supercritical fluid to plastic molded products have been made. For example, in Japanese Laid-Open Patent Publication No. 72058 of 1996, a plastic recycling method by means of supercritical water is presented. In Japanese Laid-Open Patent Publication No. 511278 of 1994, a method for removing residual additives from an elastomer product by means of a supercritical fluid is presented. In Japanese Laid-Open Patent Publication No. 181050 of 1996, for removing a resist used for lithography, a method using supercritical carbon dioxide is presented. In Japanese Laid-Open Patent Publication No. 197021 of 1996, a cleaning device for minute processed goods such as a semiconductor device and liquid crystal display by using a supercritical fluid is presented. However, these new attempts using a supercritical fluid are not intended for post-processing for plastic molded products which is the object of the present invention.

SUMMARY OF THE INVENTION

The object of the invention is, therefore, to provide a simple, clean, and new surface reforming method for a plastic molded product in which it is unnecessary to use harmful solvents with the danger of explosion and an extremely dangerous high voltage, generation of harmful substances and powder is prevented, and troublesome post-processing and expensive equipment for safety countermeasures are not required, and a surface reformed plastic molded product which is obtained thereby.

The present inventors made earnest investigation in order to achieve the above object, and as a result, found that, when a plastic molded product was immersed in supercritical carbonate dioxide or subcritical carbonate dioxide under specific conditions and then said carbon dioxide was dried under specific conditions, an excellent surface reforming effect was obtained, whereby the present invention is completed.

That is, according to the first aspect of the invention, a surface reforming method for a plastic molded product is provided which comprises a step (a) for immersing a plastic molded product into supercritical carbon dioxide or subcritical carbon dioxide under a temperature lower than the glass transition temperature of said plastic, and a step (b) for vaporizing carbon dioxide adhered to the surface of the plastic molded product under a temperature lower than the glass transition temperature of said plastic.

In addition, according to the second aspect of the invention, a surface reforming method for a plastic molded product is provided wherein, in the first aspect of the invention, the temperature condition in step (a) is equal to or higher than 0° C. in a range lower than the glass transition temperature of said plastic.

Furthermore, according to the third aspect of the invention, a surface reforming method for a plastic molded product is provided wherein, in the first aspect of the invention, the temperature condition in step (b) is equal to or higher than 15° C. in a range lower than the glass transition temperature of said plastic.

Furthermore, according to the fourth aspect of the invention, a surface reforming method for a plastic molded product is provided wherein, in the first aspect of the invention, the plastic molded product is formed from a thermoplastic resin having a polar group.

Moreover, according to the fifth aspect of the invention, a surface reforming method for a plastic molded product is provided wherein, in the fourth aspect of the invention, the polar group is any of an ester group, carbonate group, amide group, and aryl group.

Furthermore, according to the sixth aspect of the invention, a surface reforming method for a plastic molded product is provided wherein, in the first aspect of the invention, the plastic molded product has a form of a film or bottle.

Moreover, according to the seventh aspect of the invention, a surface reforming method for a plastic molded product is provided wherein, in the first or sixth aspect of the invention, the plastic molded product is any of a biaxially oriented polyester film, unoriented polystyrene film, and a biaxially oriented polystyrene film.

Furthermore, according to the eighth aspect of the invention, a surface reforming method for a plastic molded product is provided wherein, in the first or sixth aspect of the invention, the plastic molded product is a polyester bottle obtained by blow molding.

Moreover, according to the ninth aspect of the invention, a surface reformed plastic molded product is provided which is obtained by the method according to any one of the first through eighth aspects.

DETAILED DESCRIPTION OF THE PREFERRED EMBODIMENTS

1. Plastic Molded Product

The surface reforming method of the invention is applied to a molded product obtained by molding a plastic material (hereinafter, referred to as "plastic molded product"). The "molded product" used in the present specification means products having variable forms including a product having a structure of a planar form such as a sheet or film, not to mention a product having a so-called three-dimensional structure.

Therefore, the manufacturing method for a plastic molded product of the invention is not especially limited, and conventional molding methods such as injection molding, extrusion, blow molding, calender molding, compression molding, transfer molding, lamination molding, and casting, or other generally-known manufacturing method can be used. In the case where the plastic molded product is a sheet or film, the sheet or film can be an unoriented sheet or film obtained by means of an extrusion or inflation method, or a uniaxially oriented or biaxially oriented sheet or film obtained by stretching a unoriented plastic material.

The material for a polymer composing the plastic molded product is not especially limited, and various macromolecule resins can be used. As a typical resin, for example, thermoplastic resins including a olefin-based resin, halogen-contained resin, vinyl alcohol-based resin, vinyl ester-based resin, methacryl or acryl (hereinafter, abbreviated to (meth) acryl) based resin, styrene-based resin, ABS (alloy made from acrylonitrile, butadiene, and styrene) resin, polyester-based resin, polyamide-based resin, polycarbonate-based resin, cellulose derivative, polyether-based resin, polyether sulfone-based resin, polysulfone-based resin, polylactone-based resin, rubber and elastomer, thermosetting resins including an epoxy resin, undersaturated polyester resin, polyurethane-based resin, diarylphthalate resin, and silicon resin, and alloys formed by combining these resins can be used.

For a olefin-based resin, for example, homopolymer such as polyethylene or polypropylene, or an ethylene-(meth) acrylic acid copolymer can be used.

As a halogen-contained resin, chloride-based resins including halogenated vinyl-based resin (such as polyvinyl chloride, a vinyl chloride-vinyl acetate copolymer, a vinyl chloride-(meth)acrylic acid ester copolymer, or polyvinyl fluoride), and halogenated vinylidene-based resin; fluorine-based resins including polytetrafluoroethylene, polychlorotrifluoroethylene, polyvinylidene fluoride, polyvinyl fluoride, a tetrafluoroethylene-hexafluoropropyrene copolymer, a tetrafluoroethylene-perfluoroalkylvinylether copolymer, and tetrafluoroethylene-ethylene copolymer can be used.

For a vinyl alcohol resin, polyvinyl alcohol, a ethylene-vinyl alcohol copolymer and so on can be used.

For a vinyl ester-based resin, a simple or copolymer of vinyl ester-based monomer (such as polyvinyl acetate), a copolymer of vinyl ester-based monomer and copolymeric monomer (such as vinyl acetate-ethylene copolymer, vinyl acetate-vinyl chloride copolymer, vinyl acetate-(meth) acrylic acid ester copolymer and so on) can be used.

For a (meth)acryl-based resin, for example, poly(meth) acrylic acid ester such as poly(meth)acrylic acid methyl, methacrylic acid methyl-(meth)acrylic acid copolymer, methacrylic acid methyl-(meth)acrylic acid ester-(meth) acrylic acid copolymer, methacrylic acid methyl-(meth) acrylic acid ester copolymer, and (meth)acrylic acid ester-styrene copolymer (MS resin) can be used. For a preferable (meth)acryl-based resin, acrylic acid $C_{1-5}$ alkyl and methacrylic add methyl-acrylic acid ester can be used.

For a styrene-based resin, a simple or copolymer of a styrene-based monomer (such as polystyrene, a styrene-α-methylstyrene copolymer, and so on), and a styrene-based copolymer (styrene-acrylonitrile copolymer (AS resin), styrene-methacrylic acid ester copolymer, styrene-maleic add anhydride copolymer) can be used.

For a polyester-based resin, aromatic polyester using aromatic dicarboxylic acid such as terephthalic acid (homopolyester such as polyalkylene terephthalate including polyethylene terephthalate and polybuthylene terephthalate, copolyester containing alkylene terephthalate units as main ingredients and so on), and aliphatic polyester using aliphatic dicarboxylic acid can be used.

For a polyamide-based resin, fatty polyamide such as nylon 46, nylon 6, nylon 66, nylon 610, nylon 612, nylon 11, or nylon 12 can be used. The polyamide-based resin is not limited to homopolyamide, and can be copolyamide.

For a polycarbonate resin, aromatic polycarbonate containing a sort of bisphenol (for example, bisphenol A), and aliphatic polycarbonate such as diethyleneglycol bisarylcarbonate can be used.

As a cellulose derivative, cellulose ester (cellulose acetate, cellulose phthalate), a sort of cellulose carbamate (cellulose phenylcarbamate or so on), and a sort of cellulose ether (cyanoethyl cellulose or so on) can be used.

Among these plastic materials, a preferable polymer is a thermoplastic resin, in particular, a thermoplastic resin having a polar group, and as said polar group, for example, an ester group, carbonate group, amide group, or aryl group can be used.

Typical examples of such a polymer having a polar group are a polyester-based resin such as polyethylene terephthalate and polyethylene naphthalate; a polystyrene-based resin which is a simple or copolymer of styrene-based monomer; a polyamide-based resin such as nylon 6, nylon 66, nylon 612, nylon 11, and nylon 12; and a cellulose-based resin such as cellulose triacetate and cellulose diacetate.

The plastic molded product of the invention may be a molded product obtained by thermosetting or UV-setting as mentioned above. The form of the plastic molded product is not especially limited, and it can be formed into any shape of a film, bottle, prism, lump, and pellet, or can be formed in a complicated shape. A preferable form of the plastic molded product is a film or a bottle formed by means of blow molding (Hereinafter, sometimes abbreviated to blow bottle).

Among the molded products mentioned above, the film can be any of a so-called unoriented film such as an extrusion film or inflation film and a uniaxially or biaxially oriented film formed by stretching process.

The thickness of the film is generally approximately 1 through 500 $\mu$m. A film with a thickness of approximately 10 through 100 $\mu$m is used as a wrapping film, a film with a thickness of approximately 100 $\mu$m is used as a photographic base film, and a film with a thickness of approximately 50 through 100 $\mu$m is used for a magnetic disk. Furthermore, a film with a thickness of 1 through 10 $\mu$m is used for a magnetic tape, a film with a thickness of approximately 100 $\mu$m is used for a substrate for a flexible liquid crystal panel, and a film with a thickness of 1 through 300 $\mu$m is used for a label. A film with a thickness of approximately 10 through 100 $\mu$m is used for a flexible printed circuit board, a film with a thickness of approximately 1 through 10 $\mu$m is used as a capacitor film, a film with a thickness of approximately 10 through 200 $\mu$m is used for a surface sheet for various switches, and a film with a thickness of approximately 10 through 100 $\mu$m is used as a base film for printing.

The surface of a molded product formed from a polymer having a polar group is preferably reformed due to interaction between said polar group and polarity of carbon dioxide. Typical examples of such a molded product are an oriented polyester film (such as a polyethylene terephthalate film, polyethylene naphthalate or so on), a polystyrene film, an oriented polystyrene film, an oriented nylon 6 film, and a blow bottle made from polyester. Among these, the surfaces of a biaxially oriented polyester film, an unoriented polystyrene film, and a biaxially oriented polystyrene film are preferably reformed.

2. Immersion Processing Step (a)

The surface reforming method of the invention is characterized in including an immersion processing step (a) and a vaporization step (b) following step (a), and in step (a), a plastic molded product is immersed in supercritical carbon dioxide or subcritical carbon dioxide under a temperature lower than the glass transition temperature of said plastic.

The abovementioned supercritical carbon dioxide means carbon dioxide in a liquid state in a range in which the liquid carbon dioxide has a temperature equal to or higher than the critical temperature and a pressure equal to or greater than the critical pressure. Incidentally, in the case of carbon dioxide ($CO_2$), the critical temperature is 31° C., and the critical pressure is 72.8 atmospheres (7.38 Mpa).

The subcritical carbon dioxide means carbon dioxide in a liquid state having a temperature (for example, between 0° C. and 31° C., in particular, a room temperature of approximately 28° C.) lower than the critical temperature and a equal to or pressure more than the critical pressure of 72.8 atmospheres.

The method for immersing a plastic molded product in supercritical carbon dioxide or subcritical carbon dioxide is not especially limited, and for example, there is a method in which a simple plastic molded product or film is put into a supercritical container filled with supercritical carbon dioxide or subcritical carbon dioxide and processed in a batch manner, and a method in which a simple plastic molded product or film is led into a processing zone of supercritical carbon dioxide or subcritical carbon dioxide and successively processed.

As the latter method, for example, a method (Japanese Laid-Open Patent Publication No. 268344 of 1992), in which a zone of supercritical carbonate dioxide or subcritical carbon dioxide is formed by means of oil sealing, and a rolled film is successively sent and supplied to the zone, can be used.

The immersion temperature in step (a) is not limited as far as the temperature is lower than the glass transition temperature of the plastic forming said plastic molded product, however, in order to increase the effect of surface activation and achieve effective processing in a short time, it is preferable that the temperature is close to the glass transition temperature. In terms of operation performance and processing efficiency, a preferable immersion temperature is equal to or higher than 0° C. and lower than the glass transition temperature of said plastic, and more preferably, equal to or higher than 15° C. and lower than the glass transition temperature of said plastic. In addition, in the case where the immersion temperature is equal to or higher than the glass transition temperature of said plastic, in the following vaporization step, the surface of the molded product is foamed, and the mechanical strength of the surface of the molded product may be lowered, or the adhesion power with a coating film may be easily lowered. Therefore, this case is not preferable.

On the other hand, it is preferable that the pressure in step (a) is as high as possible in order to increase the effect of surface activation and processing efficiency, however, if the operation performance and the cost of equipment are taken into account, for example, a pressure of approximately 100 through 400 atmospheres is proper.

Furthermore, the immersion time in step (a) is not especially limited, and any time is allowable as far as the effect of surface activation is somewhat obtained for the plastic molded product, however, normally, 0.5 through 25 minutes is preferable, 0.7 through 20 minutes is more preferable, and 0.8 through 15 minutes is especially preferable.

3. Vaporization Step (b)

In the surface reforming process of the invention, following the abovementioned step (a), vaporization process (b) is carried out, and in step (b), carbon dioxide adhering to the surface of the plastic molded product is vaporized and removed by being exposed under a temperature lower than the glass transition temperature of said plastic.

The temperature for vaporizing carbon dioxide is not limited as far as the temperature is lower than the glass transition temperature of the plastic forming the plastic molded product, however, in the case of plastic, since the glass transition temperature is usually 80° C. or higher, normally, the molded product is left at a room temperature to vaporize carbon dioxide, or the product is heated slightly to promote vaporization, and carbon dioxide is vaporized. A preferable vaporizing temperature is 15° C. or higher and lower than the glass transition temperature. If the vaporizing temperature is the glass transition temperature or higher, the surface of the plastic molded product forms, and the mechanical strength of the surface of the molded product is lowered, or the adhesion power with the coating film is easily lowered. Therefore, this case is not preferable.

The pressure when vaporizing carbon dioxide is not especially limited, however, a normal pressure in terms of operation performance and workability is preferable.

It is preferable that vaporized carbon dioxide is recovered and recycled in consideration of the prevention of global warming. For recovery of carbon dioxide, for example, a recovery apparatus of a supercritical fluid shown in FIG. 1 (Japanese Laid-Open Patent Publication No. 197021 of 1996, and others) can be used.

Briefly explaining the operation of the abovementioned apparatus with reference to FIG. 1, a molded product whose surface is processed in processing chamber 1 is heated by heater 5, and carbon dioxide adhered on the surface is vaporized, and then the vaporized carbon dioxide is not discharged to the atmosphere as it is, but is pressurized by pressurizing pump P1 and temporarily stored in buffer tank 7, and then reused as carbon dioxide for processing in the surface processing chamber 1 as necessary.

By this apparatus, not only discharge of carbon dioxide to the atmosphere is prevented, but also recovered carbon dioxide can be easily reused by being processed again into supercritical carbon dioxide or subcritical carbon dioxide.

Briefly explaining the principle of the surface reforming method of the invention, it is supposed that, by immersing a plastic molded product in supercritical carbon dioxide or subcritical carbon dioxide under a temperature lower than the glass transition temperature of said plastic, oligomer normally deposited on the surface of the plastic molded product is removed, and the surface or surface layer of the plastic molded product is temporarily impregnated with supercritical carbon dioxide or subcritical carbon dioxide, and then the carbon dioxide is vaporized under a temperature lower than the glass transition temperature of said plastic, whereby the surface of the plastic molded product is reformed.

Then, the reformed surface of the plastic molded product is activated, so that the adhesion strength with a coating film or laminated plastic film is significantly increased.

EXAMPLES

Hereinafter, the invention shall be described in more detail based on examples, however, the invention is not limited to these examples.

Example 1

A biaxially oriented polyethylene terephthalate film (PET) (with a thickness of 250 $\mu$m, manufactured by Teijin Ltd.) was immersed in subcritical carbonate dioxide under the conditions shown in Table 1 and extracted to the atmosphere, and then carbon dioxide was vaporized (Examples 1-A and I-B). The glass transition temperature of the abovementioned polyethylene terephthalate was approximately 90° C.

A CPS sheet (formed by blending polystyrene and ethylene butadiene copolymer at a ratio of 1 to 1 so as to have a thickness of 0.6 mm) was laminated on the film, pressed for 5 minutes by a pressure of 140 kg/cm$^2$ at 120° C., whereby a laminated film was prepared. Next, the adhesion strength (maximum load) of this laminated film was measured by a 180-degree separation test (sample width: 1 cm, tension speed: 200 mm/min.). The result is shown in Table 2.

It is confirmed that the biaxially oriented polyethylene terephthalate film is satisfactorily adhered with the CPS sheet due to the effect of surface reformation by means of subcritical carbon dioxide.

Comparative example 1

A CPS sheet was laminated in the same manner as in Example 1 on the same biaxally oriented polyethylene terephthalate film as in Example 1 which was left unprocessed, and the adhesion strength of an obtained laminated film was measured. The result is shown in Table 2.

In comparison with Example 1, the adhesion strength is weak since surface reformation was not carried out.

Comparative example 2

The same biaxially oriented polyethylene terephthalate film as in Example 1 was immersed in chloroform for 8 hours at 60° C., a CPS sheet was laminated thereon in the same manner as in Example 1, and then the adhesion strength of the obtained laminated film was measured. The result is shown in Table 2.

Due to surface reformation by means of a special solvent of chloroform, in comparison with the unprocessed case of Comparative example 1, the adhesion strength is stronger, however, the strength does not reach the strength of Example 1-B.

Example 2

A biaxially oriented polystyrene film (OPS) (thickness: 210 $\mu$m, manufactured by Daicel Chemical Industries Ltd.) was immersed in supercritical carbon dioxide under the conditions shown in Table 1, and extracted to the atmosphere, and then the carbon dioxide was vaporized (Examples 2-A and 2-B). The glass transition temperature of the abovementioned polystyrene was approximately 100° C.

A CPS sheet was laminated on this film in the same manner as in Example 1, and the adhesion strength of the obtained laminated film was measured. The result is shown in Table 2.

Comparative example 3

A CPS sheet was laminated in the same manner as in Example 1 on the same biaxially oriented polystyrene film as in Example 2 which was left unprocessed, and the adhesion strength of the obtained laminated film was measured. The result is shown in Table 2.

Example 3

The same biaxially oriented polyethylene terephthalate film as in Example 1 was immersed in supercritical carbon dioxide under the conditions shown in Table 1, and extracted to the atmosphere, and then the carbon dioxide was vaporized. Thereafter, a CPS sheet was laminated on the film in the same manner as in Example 1, and the adhesion strength of the obtained laminated film was measured (Examples 3-A and 3-B). The result is shown in Table 2.

Since the film was immersed in supercritical carbon dioxide, the same effect of surface reformation as in Example 1 was obtained by immersion for a short time.

Example 4

The same biaxially oriented polyethylene terephthalate film as in Example 1 was immersed in supercritical carbon dioxide under the conditions shown in Table 1, extracted to the atmosphere, and the carbon dioxide was vaporized, and then a CPS sheet was laminated thereon in the same manner as in Example 1, and the adhesion strength of the obtained laminated film was measured (Examples 4-A and 4-B). The result is shown in Table 2.

Since the film was immersed in supercritical carbon dioxide at a high pressure (Example 4-A) or a high temperature (Example 4-B), the same effect of surface reformation was obtained by immersion for a shorter time than that of Example 3.

TABLE 1

| | Film | Immersing condition | Vaporizing condition |
|---|---|---|---|
| Example 1-A | PET | 28° C., 200 atm., 3 min. | Left at a room temperature |
| Example 1-B | PET | 28° C., 200 atm., 15 min. | Dried for 1 min. at 40° C. and then left at a room temperature |
| Comparative example 1 | PET | — | — |
| Comparative example 2 | PET | (Immersed in CHCl₃ for 8 h at 60° C.) | Left at a room temperature |
| Example 2-A | OPS | 40° C., 200 atm., 1 min. | Left at a room temperature |
| Example 2-B | OPS | 40° C., 200 atm., 3 min. | Dried for 1 min. at 40° C. and then left at a room temperature |
| Comparative example 3 | OPS | — | — |
| Example 3-A | PET | 60° C., 200 atm., 3 min. | Left at a room temperature |
| Example 3-B | PET | 60° C., 200 atm., 6 min. | Dried for 1 min. at 60° C. and then left at a room temperature |
| Example 4-A | PET | 60° C., 200 atm., 2 min. | Left at a room temperature |
| Example 4-B | PET | 80° C., 200 atm., 2 min. | Dried for 1 min. at 80° C. and then left at a room temperature |

TABLE 2

| | Max load (kgf) | Note |
|---|---|---|
| Example 1-A | 0.92 | |
| Example 1-B | 1.43 | CPS sheet torn during test. |
| Comparative example 1 | 0.48 | |
| Comparative example 2 | 0.99 | CPS sheet torn during test. |
| Example 2-A | 1.02 | |
| Example 2-B | 1.40 | CPS sheet torn during test. |
| Comparative example 3 | 0.60 | |
| Example 3-A | 1.05 | |
| Example 3-B | 1.34 | CPS sheet torn during test. |
| Example 4-A | 1.40 | CPS sheet torn during test. |
| Example 4-B | 1.45 | CPS sheet torn during test. |

Example 5 and Comparative Example 4

The same biaxially oriented polyethylene terephthalate film as in Example 1 was immersed in supercritical carbon oxide under the conditions shown in Table 3, and extracted to the atmosphere, and the carbon dioxide was vaporized (Example 5-A, 5-B, and 5-C).

The contact angle of the obtained film was metered (the contact angle of a water drop at the film surface, temperature: 40° C., apparatus: FACE auto contact angle meter CA-Z type). At the same time, as in Comparative example 4, the contact angle of the same biaxially oriented polyethylene terephthalate film (unprocessed) as in Example 1 was metered. The result is shown in Table 4.

As is clearly understood from Table 4, by immersing the film supercritical carbon dioxide, the contact angle significantly increases. This increase in contact angle means that the surface of the film was reformed, and the wetting characteristic of the ink was improved.

TABLE 3

| | Film | Immersing condition | Vaporizing condition |
|---|---|---|---|
| Example 5-A | PET | 40° C., 200 atm., 3 min. | Left at a room temperature |
| Example 5-B | PET | 60° C., 200 atm., 3 min. | Dried for 1 min. at 60° C. and then left at a room temperature |
| Example 5-C | PET | 80° C., 200 atm., 2 min. | Dried for 1 min. at 80° C. and then left at a room temperature |
| Comparative example 4 | PET | — | — |

TABLE 4

| | Contact angle |
|---|---|
| Example 5-A | 82.2° |
| Example 5-B | 80.1° |
| Example 5-C | 81.3° |
| Comparative example 4 | 69.1° |

Example 6 and Comparative example 5

A polycarbonate resin (PC) (manufactured by Teijin, Ltd., Standard grade L- 1225) was used as plastic and molded into an ASTM638 dumbbell-type test piece (width: 13 mm, thickness: 3 mm, length at the parallel section: 57 mm). This test piece was immersed in supercritical carbon dioxide under the conditions shown in Table 5, and extracted to the atmosphere, and the carbon dioxide was vaporized (Examples 6-A and 6-B). The glass transition temperature of the abovementioned polycarbonate resin was approximately 130° C.

The contact angle of the obtained test piece was measured. At the same time, the contact angle of the unprocessed test piece as Comparative example 5 was measured. The results of these are shown in Table 6.

From Table 6, by immersing the test piece (plastic molded product) in supercritical carbon dioxide, it is understood that the contact angle remarkably increases. This increase in contact angle means that the surface was reformed, and the wetting characteristic of the ink was improved.

When the test pieces of Example 6 (Examples 6-A and 6-B) and Comparative example 5 were metallically coated, excellent coating was formed on the test piece of Example 6 in comparison with the unprocessed test piece of Comparative example 5. Furthermore, for the metallic coating, a coating containing polyester resin varnish as a main binder, xylene as a main solvent ingredient, and aluminum paste as a main metallic ingredient was used.

TABLE 5

|  | Film | Immersing condition | Vaporizing condition |
|---|---|---|---|
| Example 6-A | PC | 40° C., 200 atm., 3 min. | Left at a room temperature |
| Example 6-B | PC | 60° C., 200 atm., 3 min. | Dried for 1 min. at 60° C. and then left at a room temperature |
| Comparative example 5 | PC | — | — |

TABLE 6

|  | Contact angle |
|---|---|
| Example 6-A | 78.2° |
| Example 6-B | 80.0° |
| Comparative example 5 | 71.1° |

Example 7

A fluorine-based film (thickness: 0.6 mm, manufactured by The Ohtsu Tire & Rubber Co., Ltd.) was immersed in supercritical carbon dioxide for 5 minutes at 20° C. and 20 Mpa, and extracted to the atmosphere, and then the carbon dioxide was vaporized. When the film was checked by eye, there was no change in the transparency.

When the surface of the film thus processed was observed with an SEM (Scanning type Electronic Microscope), unevenness in the micron order was not found at the surface, and bleeding substances (plasticizer coating film) and oil were clearly removed.

According to the surface reforming method of the invention, since carbon dioxide, which itself is not harmful, and does not generate harmful substances such as ozone and nitrogen oxide, and in addition, has no danger of explosion, is used, this method is extremely safe and clean, and the cost for countermeasures against harmful substances or others is not necessary. Therefore, the surface of the plastic molded product can be activated at a low cost. Furthermore, in comparison with the prior-method using a solvent, the surface of the plastic molded product can be efficiently reformed in a short time, so that the industrial utility value of the method of the invention is extremely great.

Description of Symbols

Figure 1:
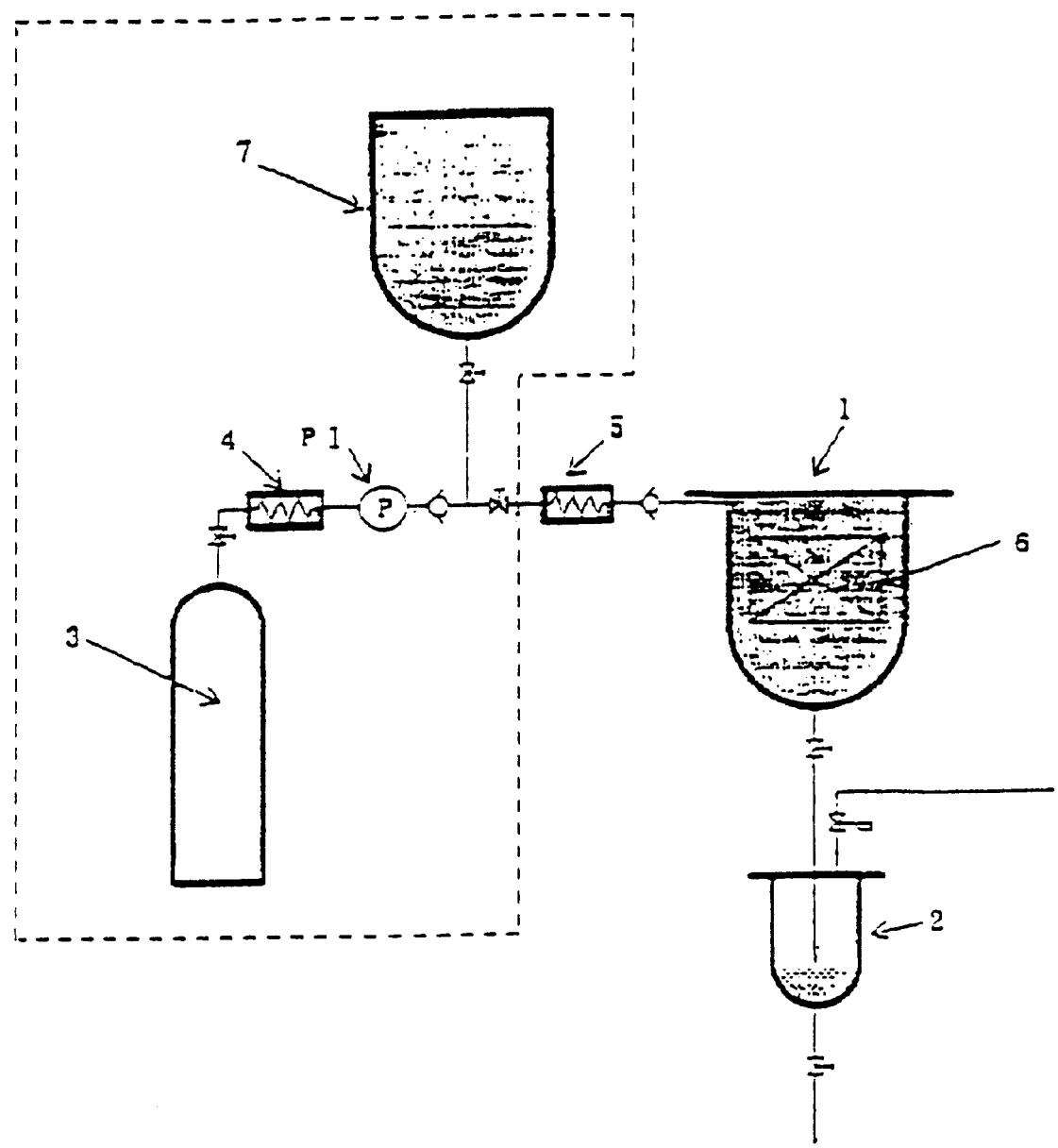
FIG. 1 is a drawing showing the construction of the apparatus for covering carbon dioxide which has been vaporized in step (b).

1 Processing chamber
2 Contaminant separation chamber
3 Liquid carbon dioxide cylinder
4 Cooler
5 Heater
6 Processing medium
7 Buffer tank
P1 Pressurizing pump

What is claimed is:
1. A surface reforming method for a plastic molded product comprising: a step (a) for immersing a plastic molded product into supercritical carbon dioxide or subcritical carbon dioxide under a temperature lower than the glass transition temperature of said plastic, and a step (b) for vaporizing carbon dioxide adhered to the surface of the plastic molded product under a temperature lower than the glass transition temperature of said plastic.

2. A surface reforming method for a plastic molded product according to claim 1, wherein the temperature condition in step (a) is equal to or higher than 0° C. in a range lower than the glass transition temperature of said plastic.

3. A surface reforming method for a plastic molded product according to claim 1, wherein the temperature condition in step (b) is equal to or higher than 15° C. in a range lower than the glass transition temperature of said plastic.

4. A surface reforming method for a plastic molded product according to claim 1, wherein the plastic molded product is formed from a thermoplastic resin having a polar group.

5. A surface reforming method for a plastic molded product according to claim 4, wherein the polar group is any of an ester group, carbonate group, amide group, and aryl group.

6. A surface reforming method for a plastic molded product according to claim 1, wherein the plastic molded product has a form of a film or bottle.

7. A surface reforming method for a plastic molded product according to claim 1 or 6, wherein the plastic molded product is any of a biaxially oriented polyester film, unoriented polystyrene film, and a biaxially oriented polystyrene film.

8. A surface reforming method for a plastic molded product according to claim 1 or 6, wherein the plastic molded product is a polyester bottle obtained by blow molding.

* * * * *